Patented Dec. 29, 1925.

1,567,974

UNITED STATES PATENT OFFICE.

CHARLES WESLEY MONROE, OF PARKERSBURG, WEST VIRGINIA.

TREATMENT OF PYORRHEA.

No Drawing. Application filed June 1, 1923, Serial No. 642,861. Renewed May 12, 1925.

*To all whom it may concern:*

Be it known that I, CHARLES W. MONROE, a citizen of the United States, residing at Parkersburg, West Virginia, have invented certain new and useful Improvements in the Treatment of Pyorrhea, of which the following is a specification.

The present invention relates to the treatment of pyorrhea, commonly called Riggs' disease, which is a disease affecting the gums surrounding the teeth, usually indicating itself by a marked loosening of the teeth, attended by a flow of pus from the alveoli.

Many remedies have been proposed for this disease, but so far as I know, the disease has been generally regarded by physicians and dentists as being extremely difficult to handle, and most of the remedies heretofore proposed failed to give satisfactory results.

After much experimentation, I have discovered that the disease can be completely cured in ordinary cases, and the patients can be very greatly helped in all cases by the use of a soluble iodide, of the alkali-forming metals. Sodium iodide has been found in my experiments to be apparently superior to any of the other iodides, although potassium iodide, strontium iodide, and generally the iodides of the alkali-forming metals can be satisfactorily used. Iodides of metals which themselves are known to have a toxic action on the system should not be employed.

The iodide is preferably used in solution, aqueous solution being satisfactory. This can be used by bathing and rubbing the gums, which operation can conveniently be repeated several times a day and also if desired, especially in aggravated cases, the iodide can be taken internally.

For internal application, it is advisable to employ other materials along with the iodide to overcome the disagreeable taste of the iodide and also to prevent it from having a disturbing effect upon the digestion.

A solution containing 8 drams of sodium iodide, 6 drops of oil of peppermint, 4 drams of essence of caroid and a sufficient amount of elixir of pepsin to make up 6 ounces of the solution, has given very satisfactory results. In some cases I have used one-half ounce of the fluid extract of licorice, in place of the tincture of caroid. Tincture of caroid is, as is well known, a digest ferment or enzyme and elixir of pepsin is also a solution of an enzyme.

Both of these materials are accordingly to be regarded as digestive enzymes. The iodide forms the essential active ingredient, so far as the treatment of pyorrhea is concerned, the other components being to some extent additive, although they also act to overcome any tendency of the iodide to interfere with the digestive system. The peppermint is used primarily as a flavoring material, to cover up the disagreeable taste of some of the other ingredients. So far as I have been able to ascertain from prior literature on pyorrhea, the use of non-poisoning soluble iodides of the alkali-forming metals is novel. The term "alkali-forming metals" as herein used is intended to cover the alkali metals and alkaline earth metals.

In taking the above mixture internally, an average dose would be about one teaspoonful.

I claim:

1. A method of treating Riggs' disease which comprises applying to the gums and affected parts, a solution containing a soluble non-poisonous iodide of an alkali-forming metal.

2. A method of treating Riggs' disease which comprises applying to the gums and affected parts, non-poisonous solution containing sodium iodide.

3. A medicinal preparation, adapted for the treatment of pyorrhea, containing a solution of a non-poisonous iodide of an alkali-forming metal, and a digestive enzyme.

In testimony whereof I affix my signature.

CHARLES WESLEY MONROE.